United States Patent
Sloth

(10) Patent No.: US 12,347,451 B2
(45) Date of Patent: Jul. 1, 2025

(54) ACOUSTIC SPEAKER COVER MATERIAL DETECTION SYSTEMS AND METHODS

(71) Applicant: Bang & Olufsen A/S, Struer (DK)

(72) Inventor: Andreas Pehn Sloth, Copenhagen (DK)

(73) Assignee: Bang & Olufsen A/S, Struer (DK)

( * ) Notice: Subject to any disclaimer, the term of this patent is extended or adjusted under 35 U.S.C. 154(b) by 158 days.

(21) Appl. No.: 17/938,207

(22) Filed: Oct. 5, 2022

(65) Prior Publication Data

US 2024/0119957 A1     Apr. 11, 2024

(51) Int. Cl.
| | |
|---|---|
| *G10L 25/51* | (2013.01) |
| *H04R 1/02* | (2006.01) |
| *H04R 3/00* | (2006.01) |
| *H04R 29/00* | (2006.01) |

(52) U.S. Cl.
CPC .............. *G10L 25/51* (2013.01); *H04R 1/023* (2013.01); *H04R 3/00* (2013.01); *H04R 29/001* (2013.01); *H04R 2430/00* (2013.01)

(58) Field of Classification Search
CPC ........... G10L 25/51; H04R 1/023; H04R 3/00; H04R 29/001; H04R 2430/00; H04R 1/2803; H04R 3/04; H04R 2430/03; G06F 18/22; G06F 18/28; G06V 10/70; G06V 10/811
See application file for complete search history.

(56) References Cited

U.S. PATENT DOCUMENTS

| | | | |
|---|---|---|---|
| 9,690,271 B2 | 6/2017 | Sheen et al. | |
| 9,728,188 B1 * | 8/2017 | Rosen | G10L 25/51 |
| 10,884,698 B2 * | 1/2021 | Hartung | H04S 7/305 |
| 11,350,234 B2 | 5/2022 | Maher et al. | |
| 2015/0355880 A1 * | 12/2015 | Kraft | H04R 1/1091 700/94 |
| 2017/0011741 A1 | 1/2017 | Hershey et al. | |
| 2019/0333473 A1 * | 10/2019 | Min | H04R 1/023 |
| 2020/0033163 A1 * | 1/2020 | Agarwal | G06N 20/00 |
| 2021/0116293 A1 * | 4/2021 | Yang | H04R 29/001 |
| 2021/0132897 A1 * | 5/2021 | Song | G06F 3/165 |
| 2021/0400377 A1 * | 12/2021 | Lai | H04R 1/1008 |
| 2022/0217463 A1 * | 7/2022 | Panecki | H04R 1/1041 |

OTHER PUBLICATIONS

Venkatesh, "Classifying environmental sounds using image recognition networks", Procedia Computer Science, 112, Sep. 2017, 2048-2056.

* cited by examiner

*Primary Examiner* — Akelaw Teshale
(74) *Attorney, Agent, or Firm* — Patterson + Sheridan, LLP

(57) ABSTRACT

A system for detecting a cover sound profile, the cover sound profile including at least one sound sample produced from sound diffracted by a cover. The system includes a device comprising a housing and at least one speaker driver, at least on microphone, and at least one processor. The device is configured to selectively couple the cover via the housing and produce a sound via the at least one speaker driver. The at least one microphone configured to detect the sound and produce an electrical signal from the detected sound. The at least one processor is configured to receive the electrical signal determine, using machine learning, that the spectrogram meets or surpasses a similarity threshold to the sound cover profile, and change at least one characteristic of the device based on an adjustment operation associated with the determined cover sound profile.

20 Claims, 5 Drawing Sheets

ACOUSTIC SPEAKER COVER MATERIAL DETECTION SYSTEMS AND METHODS

TECHNICAL FIELD

Embodiments of the present disclosure relate generally to the field of acoustic sensing. In particular, the present disclosure relates to systems and methods for recognition of cover sound profiles for speaker covers, which can be used to optimize a device configuration.

BACKGROUND

Speaker covers, including speaker grilles, are used to protect a speaker and its drivers against external factors such as debris and dust, and to improve the aesthetic appeal of the speaker. Without speaker covers, fine dust particles can get inside the speaker and reduce sound quality or sound delivery.

One drawback to the use of speaker covers is the influence the speaker cover can have on produced sound. For example, at higher frequencies, the sound of the speaker can be affected. A conventional approach to implementing speaker covers is to calibrate the speaker to account for the speaker cover. However, such approaches generally result in reduced sound quality when the speaker cover is removed and do not allow for automatic recalibration should a different type of speaker cover be used.

SUMMARY

A need exists, therefore, for systems and methods of recognizing cover sound profiles for speaker covers, such that the presence and type of a speaker cover can be detected, allowing for optimization of the speaker settings to account for the used cover.

In one aspect, the present disclosure provides for a system for detecting a cover sound profile, the cover sound profile including at least one sound sample produced from sound diffracted by a cover. The system includes a device comprising a housing and at least one speaker driver, at least on microphone, and at least one processor. The device is configured to selectively couple the cover via the housing and produce a sound via the at least one speaker driver. The at least one microphone configured to detect the sound and produce an electrical signal from the detected sound. The at least one processor is configured to receive the electrical signal, determine, using a machine learning algorithm, that the spectrogram meets or surpasses a similarity threshold to the cover sound profile, and change at least one characteristic of the device based on an adjustment operation associated with the determined cover sound profile.

In embodiments, the at least one sound sample is at least one spectrogram and the at least one processor is further configured to convert the electrical signal to a spectrogram. In such embodiments, when the spectrogram meets or surpasses the similarity threshold to the sound cover profile the cover is determined to be coupled to the housing.

In embodiments the at least one microphone is configured to detect the sound only upon receiving a test command. The at least on microphone can be a microphone array.

The sound can be white noise or produced at an ultrasonic frequency-range according to embodiments.

In embodiments, the cover is comprised of one or more of wood, fabric, 3D-knit, plastic, marble or other stone, metal such as stainless steel and aluminum, glass, rubber, and leather. The cover can include one or more perforations.

The at least one processor is further configured to update the determined cover sound profile to include the spectrogram according to embodiments.

In embodiments, the machine learning algorithm can incorporate one or more of image recognition or a mathematical transform, such as a Fast Fourier Transform.

In embodiments, the determining is based in part on whether a preceding spectrogram from a previous detected sound failed to meet or surpasses the similarity threshold with the cover sound profile.

In a second aspect, the present disclosure provides for a method for detecting a cover sound profiles, the cover sound profile including at least one sound sample produced from sound diffracted by a cover. The method includes producing a sound via a speaker driver, detecting the sound via a microphone, producing an electrical signal from the detected sound, transmitting the electrical signal to a processor, converting, at the processor, the received electrical signal to a spectrogram, determining, using a machine learning algorithm, that the electrical signal meets or surpasses a similarity threshold to the cover sound profile, and changing at least one characteristic of a device based on the control operation mapped to the determined cover sound profile.

In embodiments, the machine learning algorithm can apply a Fast Fourier Transform to the electrical signal and/or image recognition to a spectrogram of the electrical signal.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
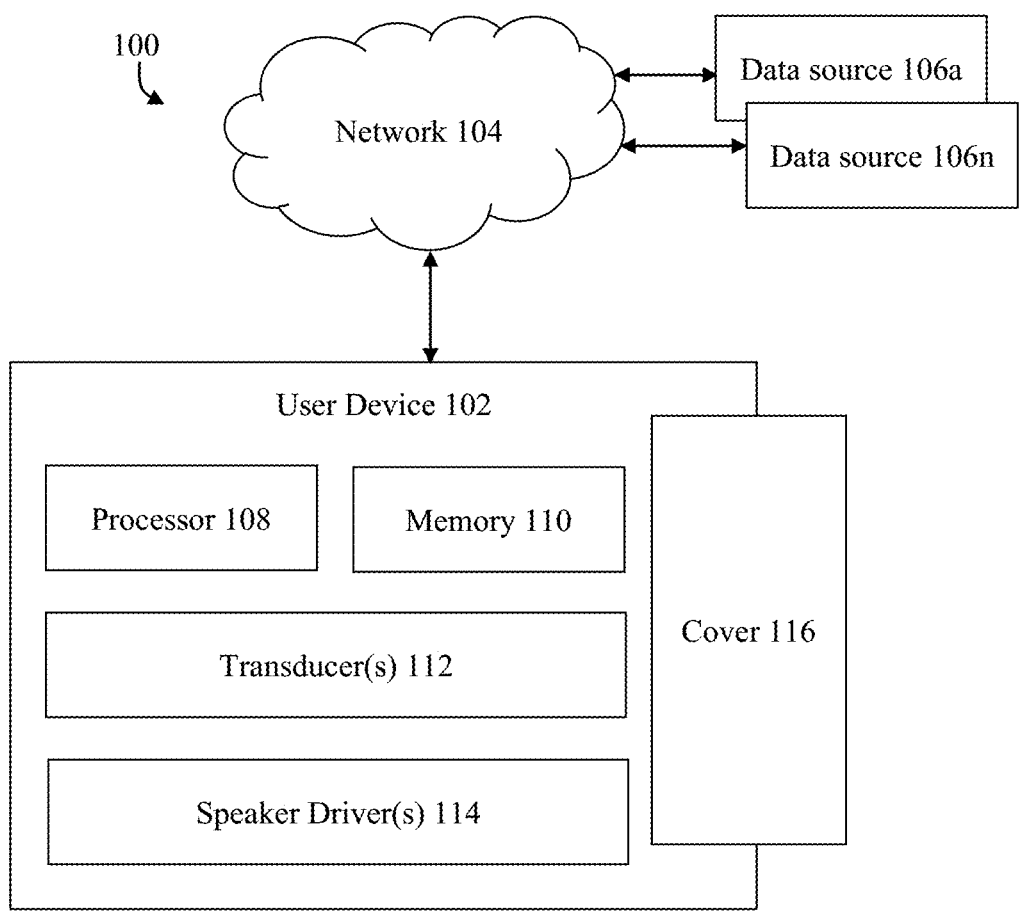
FIG. 1 is a block diagram of a system for processing cover sound profiles, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments of the present disclosure are directed to systems and methods for recognizing when or how sound generated by a speaker is influenced by a speaker cover through comparison with a known cover sound profile. Cover sound profiles can be used to identify the presence and type of cover used with a speaker by recognizing unique sound characteristics associated with each cover. Detection of cover sound profiles can be used to tune the speaker according to the specific speaker cover in order to counteract effects of the influence of the speaker cover on the produced sound. The comparison of produced sound with cover sound profiles can be accomplished by applying image recognition to match a spectrogram of the produced sound to spectrograms included in each cover sound profile. This comparison process can be accomplished by applying a machine learning algorithm (MLA) to the image recognition process.

The inventors of the present disclosure have recognized that the cover of a speaker alters the sound of a speaker and that the alteration can be measured with the microphones built into the speaker such that corrections can be made to the speaker settings to account for different effects speaker covers without any hardware changes to the speaker or cover. In other words, the measurement of the alteration of sound can act as a "fingerprint," or cover sound profile, for any given speaker cover.

Embodiments of the present disclosure are operable to detect and classify cover sound profiles associated with speaker covers without relying on conventional ways of component identification such as RFID tags. Accordingly, the present disclosure is operable for use with existing speakers and speaker covers.

Referring to FIG. 1, a block diagram of a system 100 for identifying the presence and type of speaker covers is depicted, according to an embodiment. System 100 can be used to receive and analyze sound produced by user device 102 and generally comprises a user device 102, a network 104, and at least one data source 106.

User device 102 generally comprises a processor 108, memory 110, at least one transducer 112, and at least one speaker driver 114. Examples of user device 102 include speakers, headphones, earbuds, smartphones, tablets, laptop computers, wearable devices, other consumer electronic devices or user equipment (UE), and the like. The term "user device" will be used herein throughout for convenience but is not limiting with respect to the actual features, characteristics, or composition of any device that could embody user device 102.

User device 102 can comprise a housing including capability to removably couple cover 116. Notably, detection and classification of cover sound profiles associated particular speaker covers can be accomplished irrespective of the housing of user device 102 or design of cover 116. Accordingly, one benefit realized by embodiments of the present disclosure is structural and/or material freedom with respect to at least the housing of user device 102 and cover 116.

Processor 108 can be any programmable device that accepts digital data as input, is configured to process the input according to instructions or algorithms, and provides results as outputs. In an embodiment, processor 108 can be a central processing unit (CPU) or a microcontroller or microprocessor configured to carry out the instructions of a computer program. Processor 108 is therefore configured to perform at least basic arithmetical, logical, and input/output operations.

Memory 110 can comprise volatile or non-volatile memory as required by the coupled processor 108 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, or optical disc storage, for example. The foregoing lists in no way limit the type of memory that can be used, as these embodiments are given only by way of example and are not intended to limit the scope of the present disclosure.

Transducer 112 refers to any device capable of sensing, detecting, or recording sound to produce an electrical signal and any device that converts an electrical signal to sound waves. Transducer 112 can be a cardioid, omnidirectional, or bi-directional microphone. In embodiments, transducer 112 can be a single microphone or a microphone array comprising a plurality of microphones. Multiple microphones can be useful in distinguishing between subtle differences of detected sound and in determining the angle of arrival of sounds. In some embodiments, transducer 112 can be a piezoelectric transducer. In still other embodiments, transducer 112 can combine other types of acoustic sensors or a combination of sensors or devices that together can sense sound, pressure, or other characteristics related to audible or inaudible (with respect to the sensitivity of human hearing) sound produced from touch on a surface. Such inaudible sound can include ultrasound. Transducers 112 can be configured to record and store digital sound or data derived from captured sound. Any signals produced by transducer 112 can be transmitted to processor 108 for analysis.

In embodiments, at least one transducer 112 can convert an electric signal into sound, such as a speaker driver. In such embodiments, transducer 112 can be a speaker driver configured to produce a specific portion of the audible frequency range, such as supertweeters, tweeters, mid-range drivers, woofers, subwoofers, and rotary woofers. In embodiments, one or more speaker drivers can be incorporated into user device 102.

Embodiments of system 100 generally include at least one transducer for producing sound and at least one transducer for receiving sound. Although user device 102 is depicted as a singular device, it should be understood that the functionality and elements of user device can be split between one or more devices. For example, a microphone can be external to user device 102 and detect the sound produced by user device such that it can determine if a speaker cover is present on user device 102.

System 100 can be implemented irrespective of the number or type of transducer 112, although it can be beneficial in some embodiments to have one or more transducers 112 arranged at known positions relative to the housing. In embodiments, transducers 112 can be within or outside of the housing or stored in a housing independent of the user device. For example, transducer 112 may be located within a phone and be configured to estimate a cover sound profile from an external speaker. The position of transducer 112 relative to the housing can enable more accurate cover sound profiles across devices as differences in perceived sound from the device arrangement can be mitigated or otherwise reduced. In embodiments, transducer 112 can be configured to detect sound frequencies ranging from 1 Hz to 80 kHz. In embodiments, transducer 112 can be configured to detect sound frequencies ranging from 1 kHz to 20 kHz. In embodiments, transducer 112 can be configured to detect ultrasonic frequencies ranging from 19 kHz to 22 kHz.

Cover 114 can be any speaker cover configured for use with user device 102. In embodiments, cover 114 can be removably coupled to user device 102 such that a user can customize their speaker by selecting speaker covers of different designs, materials, and colors. In embodiments, cover 114 can comprise one or more of wood, fabric, plastic, marble, metal, glass, rubber, and leather. For example, cover 114 can comprise a molded plastic cover with perforations to permit the passage of sound that is then covered by fabric. In other embodiments, cover 114 can be made entirely of one material, such as wood, with perforations therein. Generally, perforations of cover 114 has a significant impact on the overall cover sound profile. Accordingly, embodiments of the present disclosure are particularly effective when the perforations of each cover are in unique locations or are of varying sizes.

One arrangement that can be detected by the present disclosure is the absence of a speaker cover. The speaker without a speaker cover can be represented by a distinct cover sound profile. In situations where no cover is detected, a recommendation can be presented to a user to use a cover to prolong the lifetime of the speaker.

Embodiments of the present disclosure can be used with any material that is coupled, or removably coupled, to a speaker. For example, cover sound profiles can be used with headphones to detect differences in headphone cushions. Using headphones as an example, the sound produced by the headphones can be adjusted depending on the material used for headphone cushions.

User device 102 can include other features, devices, and subsystems, such as an input/output engine or sound processing engine, which comprise various engines or tools, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, some or all of the functionality of processor 108 can be carried out in a variety of physically realizable configurations across engines and should not be limited to any particular implementation exemplified herein, unless such limitations are expressly called out.

User device 102 is configured to provide two-way data communication with network 104 via a wired or wireless connection. The specific design and implementation of an input/output engine of processor 108 can depend on the communications network(s) over which user device 102 is intended to operate. User device 102 can, via network 104, access stored data from at least one data source 106.

Data source 106 can be a general-purpose database management storage system (DBMS) or relational DBMS as implemented by, for example, Oracle, IBM DB2, Microsoft SQL Server, PostgreSQL, MySQL, SQLite, Linux, or Unix solutions that is trained to interpret spectrograms or sound samples corresponding to cover sound profiles. Data source 106 can store one or more training data sets configured to facilitate future image recognition of cover sound profiles within spectrograms of capture sound or otherwise identify cover sound profiles by analyzing captured sound. In embodiments this analysis can comprise application of mathematical transforms (e.g., Fourier transform, Fast Fourier transform, wavelet transform) to better identify sound characteristics associated with speaker covers. In embodiments, data source 106 can sort or implement training data sets based on detected sound characteristics, such as reduction of high frequencies, of produced sounds. In embodiments, data source 106 can be native to user device 102 such that no connection to network 104 is necessary.

One purpose of data source 106 is to store a plurality of spectrograms that are a visual way of representing the signal strength, or "loudness," of a signal over time at various frequencies present in a particular waveform. Spectrograms provide visual representations of the presence of more or less energy and how energy levels vary over time. These visual representations can be an effective way to compare and analyze detected sounds. Spectrograms can be depicted as a heat map, i.e., as an image with the intensity shown by varying the color or brightness.

Spectrograms can be produced from known sounds being produced through known covers. Each cover can alter the produced sound in a consistent manner. These altered sounds can then be converted to spectrograms and saved within cover sound profiles that are associated with the particular cover. Variances in detected sound within a particular cover sound profile, such as those due to the distance between a receiving transducer and the cover, can be learned across robust sample sizes with each sample representing sound generated with a corresponding speaker cover installed.

Raw frequency data can also be used to detect sound characteristics without the need for the production of spectrograms. Isolating frequencies of interest can improve accuracy when using raw frequency data. For each cover sound profile a range of relevant frequencies can be identified. This range of frequencies can represent the frequencies that are most distinct from other cover sound profiles (or produced sound when no speaker cover is used). For example, if a speaker cover arrangement produces high energy levels between 18 kHz and 18.5 kHz then analysis can be limited to that range, and any different ranges of relevant frequencies for other cover sound profiles, to reduce the amount of compared data and thereby simplify calculations.

Figure 4B:
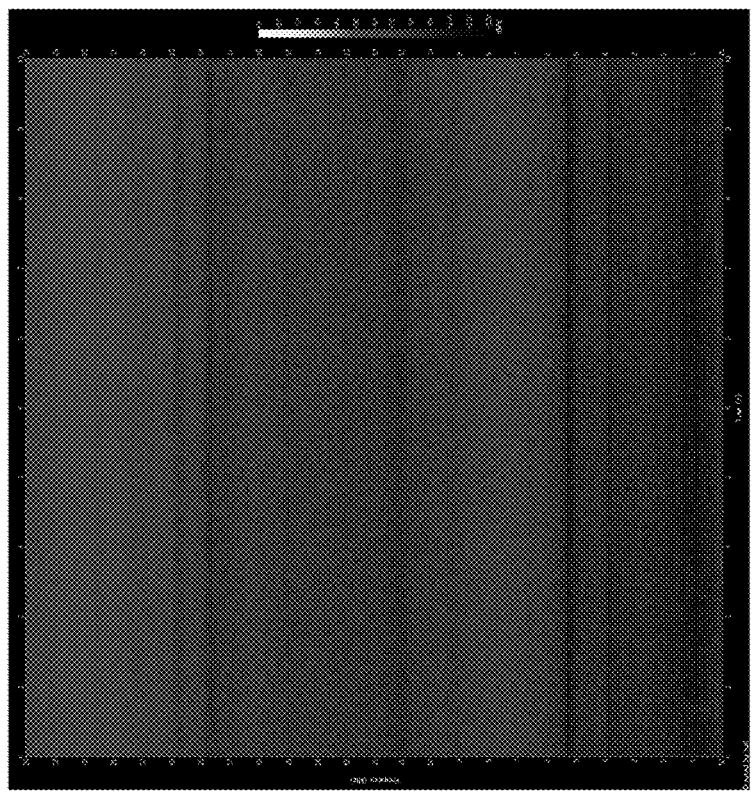
FIG. 4B is a spectrogram of a speaker with a wood cover, according to an embodiment.
Figure 4A:
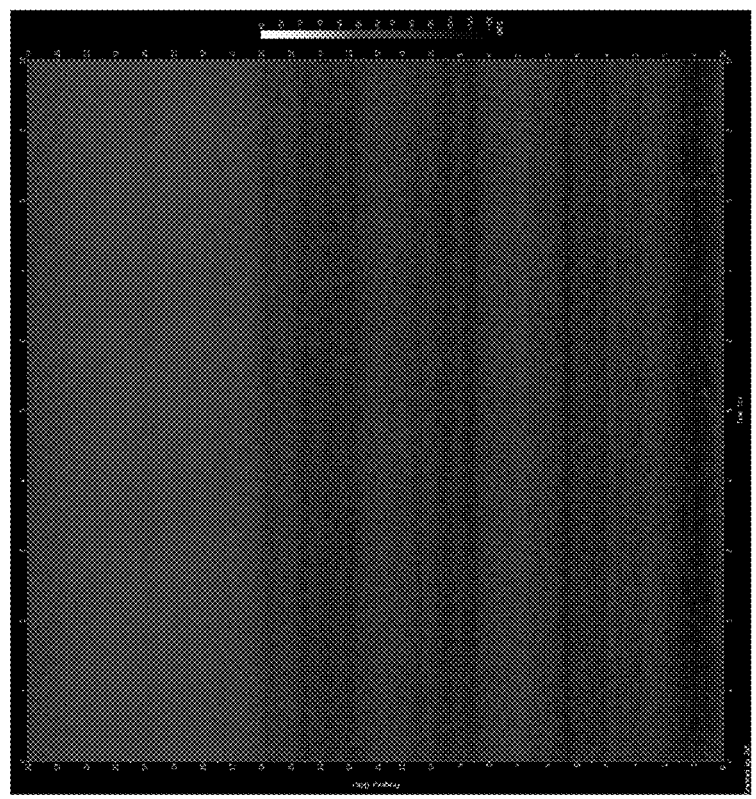
FIG. 4A is a spectrogram of a speaker with a fabric cover, according to an embodiment.
Figure 5B:
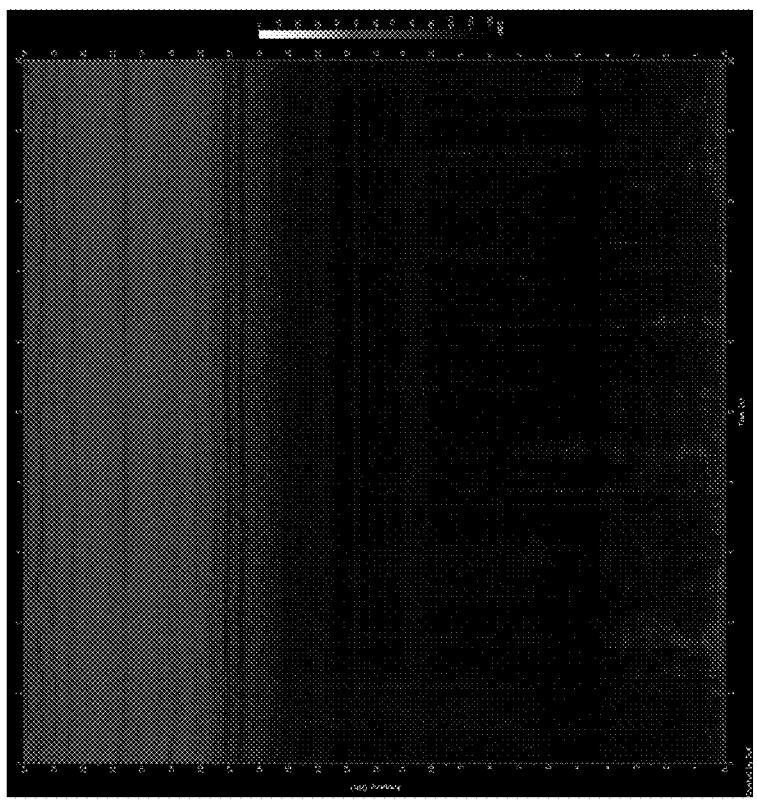
FIG. 5B is a spectrogram of a speaker with a wood cover when playing white noise from 15-20 kHz, according to an embodiment.
Figure 5A:
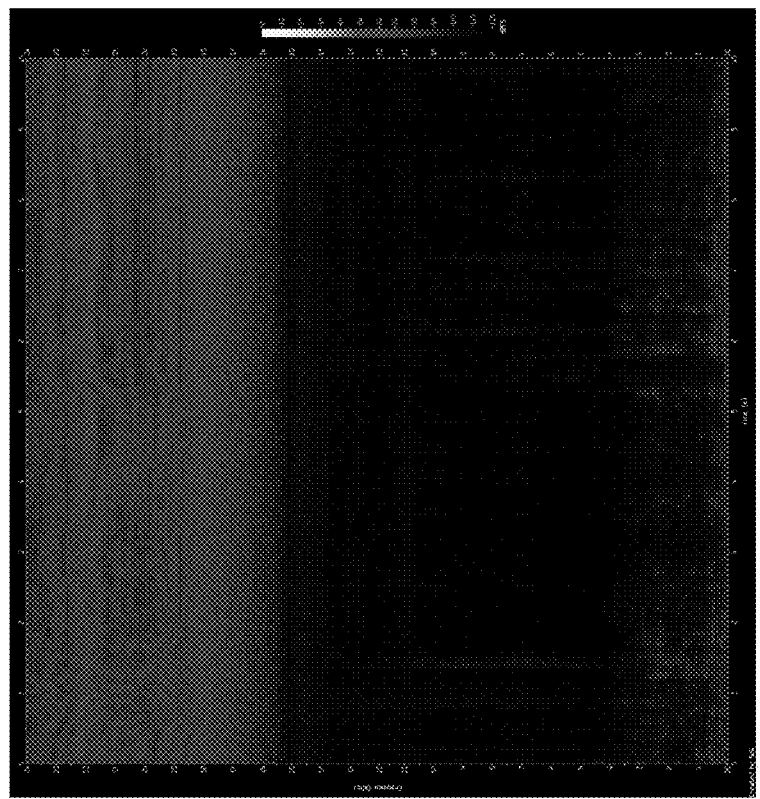
FIG. 5A is a spectrogram of a speaker with a fabric cover when playing white noise from 15-20 kHz, according to an embodiment.

The inventors of the present disclosure have recognized that speaker covers generally have similar effects on the energy levels of produced sound over time. For example, particular wood covers generally produce sounds that when converted into spectrograms have common visual characteristics (e.g., reduced high frequencies) as can be seen by contrasting spectrograms of wood covers as shown in FIGS. 4B and 5B with spectrograms of fabric covers as shown in FIGS. 4A and 5A. In embodiments, artificial intelligence (AI) or a MLA can be trained to identify spectrograms associated with speaker covers by conducting image recognition for these visual characteristics.

Visual characteristics of spectrograms associated with specific speaker covers can be extracted manually or automatically by machine learning approaches such as, for example, neural networks, to produce spectrograms for cover sound profiles. The cover sound profiles, which each contain a series of visual characteristics associated with a particular speaker cover, can then be stored in data store 106 for future image recognition comparisons with spectrograms of detected audio. Such comparisons can be accomplished by computing similarity metrics using correlation or machine learning regression algorithms. For example, if the similarity of a spectrogram to a cover sound profile is above a certain threshold, (e.g., at least 75%, at least 90%, at least 95%, or at least 99% similarity) the matching process can determine that the spectrogram represents a cover associated with the cover sound profile.

In embodiments the MLA can extract visual characteristics from particular portions of the spectrogram to better compare the effects of covers on produced sound. Compartmentalizing or enhancing certain areas of the spectrograms during image recognition analysis can improve accuracy in some circumstances by limiting the influence of outlying data (e.g., an item blocking a portion of the speaker cover).

MLA techniques can be applied to labeled (supervised) or unlabeled (unsupervised) spectrogram data. Further, a classifier can take in parameters such as type of device (a speaker and headphones may have different parameters or sound detection capabilities for example). Reasons for employing such a classifier include identifying the position of a transducer relative to the housing of the user device or the number of transducers present.

In operation, the spectrogram can be processed by the MLA to benefit from contextual information for the detected sound. In other words, the MLA can allow for processing of variable length inputs and outputs by maintaining state information over time. In one example, a speaker can repeat a period of white noise if a cover sound profile was not detected on a prior attempt. The MLA can consider the previous attempt and accordingly alter subsequent analysis of the second spectrogram, such as reducing a threshold needed to consider a particular cover sound profile matched that was the closest match on the previous comparison. Similarly, if multiple spectrograms are being produced over a short window of time, commonalities such as heightened background noise can be identified and accounted for. Thus, the context surrounding a detected sound can contribute to AI insights that account for variations in environments.

In embodiments, training data can include a plurality of spectrograms based on known sounds, pings, or white noise. These sounds can then be played on a speaker and the resulting spectrogram can be compared to the cover sound profiles. In some embodiments, the MLA can be trained to identify a cover sound profile during normal playback through the speaker. This can be accomplished where the produced spectrogram represents frequently used media, such as a song or by treating standard operating sounds (e.g., power on noise or connection established alert) as basis for training sets. With sufficient training from such examples the MLA can better recognize when observed frequency in a spectrogram represents a cover sound profile in standard device use. This analysis can be improved during operation by inclusion of feedback loops directed to common device trigger conditions.

The MLA can be trained by producing periods of white noise or ultrasonic frequencies for desired devices according to embodiments. Because sounds that are inaudible to the human ear can be used, detection and determination of speaker covers can occur during use of a device without interrupting the user's experience. Spectrograms of these known sounds can be used to improve the recognition of cover sound profiles as opposed to unknown sounds that may require more detailed comparison of spectrograms, such as over a longer period of time, to provide reliable detection of known covers. Similarly, spectrograms from known devices can improve the speed and accuracy of image recognition comparisons that are resilient to variations that may arise due to differences in device configurations.

In embodiments, the MLA can be simplified to reduce computing and power requirements. This simplification can occur by reducing the length of sound samples that are recorded or by analyzing sound samples in the frequency domain to determine the presence and/or strength of key frequencies. For example, in an embodiment instead of producing spectrograms for image recognition analysis, the power of recorded frequencies of a single sound sample for a period of time (e.g., 50 milliseconds or 3 seconds) are analyzed to determine the most likely speaker cover being used. This analysis can include a look-up table or mapping of frequencies attenuated by known speaker covers. Where computational power is limited a "best guess" approach that relies on lower similarity thresholds and reduced durations of sound samples can be used that simplifies cover matching to a look-up operation. In embodiments, the simplified MLA can be run on devices with limited computing power, such as wearables. In such embodiments, the look-up table or mapping can be accomplished by application of an MLA to sound samples (training data) without conversion to spectrograms.

In embodiments that rely on frequency comparisons the time component of sound samples need not be considered. Because speaker covers generally attenuate sound consistently over time, a purely frequency-based value comparison can be used as opposed to the frequency over time comparison used when conducting image recognition of spectrograms. This frequency approach is particularly beneficial when the speaker is configured to produce white noise or a set range of ultrasonic frequencies during the comparison process to cover sound profiles.

Figure 2:
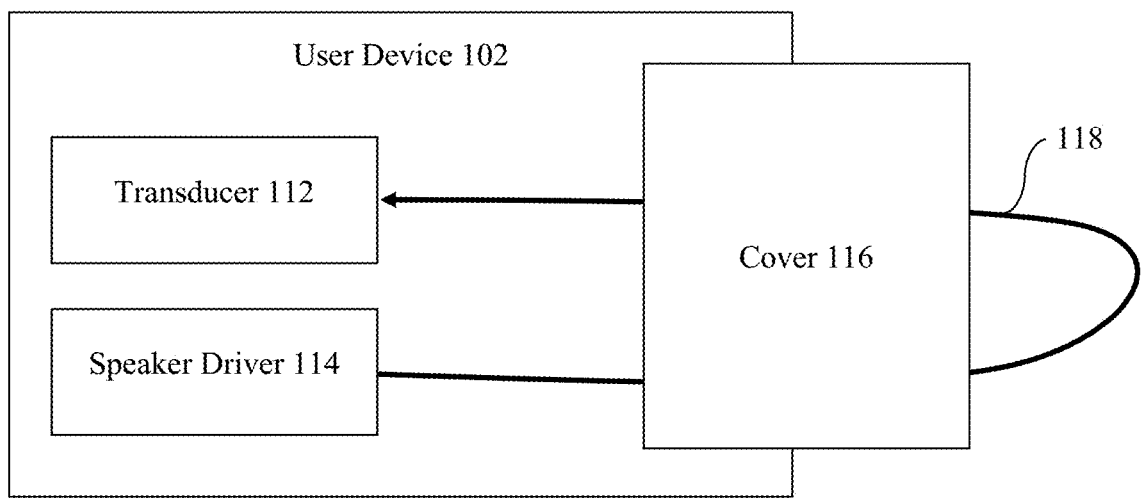
FIG. 2 is a block diagram of a system for processing cover sound profiles, according to an embodiment.

Referring to FIG. 2, a block diagram of user device 102 is depicted according to embodiments. As depicted, user device 102 can include transducer 112 and speaker driver 114. FIG. 2 additionally shows a potential path of sound 118 produced by speaker driver 114 and received by transducer 112. The influence of cover 116 can be determined by comparing the spectrogram produced by sound 118 to spectrograms associated with known covers for user device 102. In embodiments where sound 118 is used to establish cover sound profiles, recognition can be more accurate.

Figure 3:
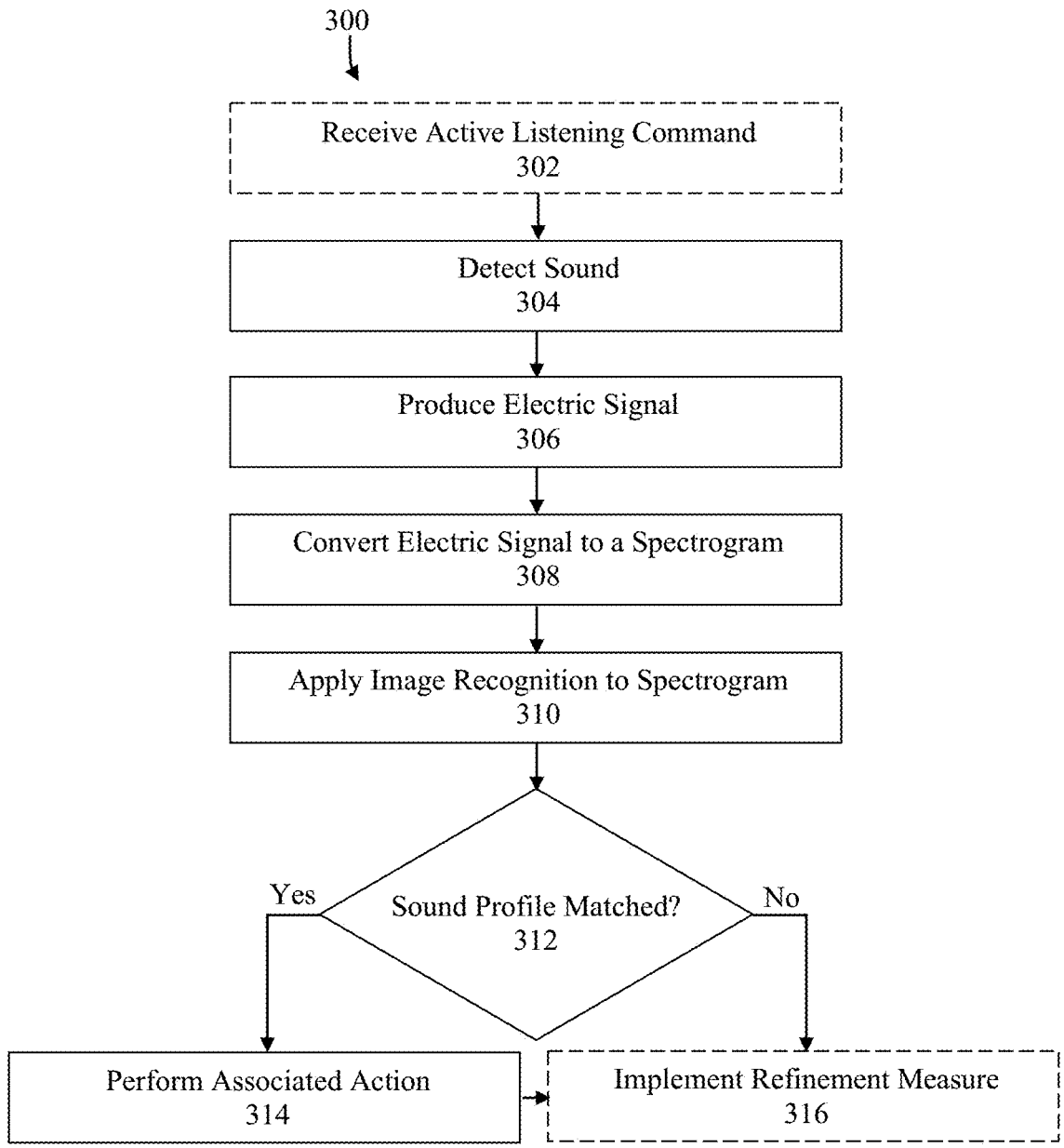
FIG. 3 is a flow chart of a method of touch input using sound, according to an embodiment

Referring to FIG. 3, a method 300 for detecting the presence and type of a speaker cover using sound is depicted, according to an embodiment. Method 300 can be implemented through a user device such as user device 102.

At 302, a test command can optionally be received by the user device to prompt the user device to check for an updated cover. The test command can be communicated through a UI of the user device or prompted by a distinct audio cue. For example, the user device may passively listen for a distinct sound cue, such as a spoken phrase, which can then prompt the user device to produce a sound to test if a cover is present. Arrangements involving test commands can prolong battery life of the user device that may result from continually or periodically processing sounds to determine if a cover is present or has changed. In embodiments, any user interaction with a user device or a device associated with the user device, can serve as a test command. Once a test command has been received by the user device a prompt or alert can be communicated to the user to indicate a test period has begun. The durations of such test periods can be customized based on user preference or user device considerations. In some embodiments, operating sounds, such as power-on sounds, can be used as test commands.

At 304, the produced sound is detected by a transducer of the user device. In embodiments, the period of sound detection can be shortened or lengthened based on known cover sound profiles and their relative uniqueness when compared to other covers for the particular user device. For example, if a cover sound profile consistently blocks a particular frequency of sound that is otherwise detected by the user device, the user device can stop listening after a comparatively short period of time where the particular frequency should have been received but was not, indicating the presence of a sound cover known to block such frequencies. Accordingly, cover sound profiles can be more efficiently detected where particular frequencies are either omitted or amplified.

In embodiments that do not rely on test commands, at 304 the user device can passively listen for sounds. Sound interpretation techniques can enable the user device to selectively process detected sounds. For example, the user device can process only the sounds that are calculated to have been produced by the user device. Parameters that may be used to effectively serve as test commands can include volume of the sound, direction of the sound, estimated location of the sound, characteristics of the sound and the like.

A confirmation alert or ping can optionally be presented to a user upon detection of a cover sound profile to prevent unwanted device adjustment according to embodiments. In such embodiments the user may then confirm a desired adjustment through repetition of a test command, a user input associated with a confirm operation, a speech command, or the like.

In some embodiments cover sound profiles can be used to adjust user device settings in real time. In one example a user may play one or more sounds during standard operation of a user device. The sounds can then trigger the device to begin ongoing image recognition of detected sound to cover sound profiles. Such real time analysis can facilitate acute control over device settings and user preferences. In embodiments, real-time sound analysis can be mimicked by frequent, periodic sampling of sound output.

For user devices that incorporate sensors, sensor data can be used to determine if a check for a new cover should be conducted. For example, if a speaker incorporates proximity sensors a close proximity reading can trigger a cover check as a user changing the cover would likely result in such a close proximity reading.

At 306, the transducer converts the detected sound into an electric signal that is transmitted to a sound processing engine. In embodiments, the sound processing engine can be the processor of the user device or exist external to the user device such as at a server communicatively coupled to the user device via a network.

At 308, the electric signal is converted by the sound processing engine into a spectrogram. In embodiments, the produced spectrogram can be processed to enhance distinguishable characteristics for cover sound profile. For example, transformations can be applied to certain audio tones or frequencies to simplify the comparison process with trained cover sound profiles or otherwise improve matching accuracy.

At 310, an image recognition MLA is applied to the produced spectrogram to determine if a cover sound profile is matched at 312. This comparison is enabled by the image recognition MLA being trained on data sets of cover sound profiles associated with known covers. In embodiments the MLA can be trained on supervised data such that training spectrograms are labeled with an associated cover. By labeling the training data for the MLA, associations between cover sound profiles that share characteristics (e.g., perforation locations or materials) can be made to improve image recognition accuracy. Notably, over time the MLA can develop similar relationships between cover sound profiles using unsupervised data but such training may be less efficient.

At 314, an adjustment operation of a user device is performed if a cover sound profile was detected. Cover sound profiles can be mapped to different adjustment operations for a user device and can be based on individual user preferences or profiles. Adjustment operations can be one or more of boosting or reducing certain frequencies or frequency ranges, changes in dynamics or beam forming characteristics, volume control, and changing an operating mode of the user device. In embodiments the adjustment operation can be for a user device separate from the device that detected the audio.

At 316, refinement measures can optionally be implemented to improve future handling of sound detection. Refinement measures can include one or more feedback loops to improve future cover sound profile recognition or personalization of the adjustment action to a user.

In embodiments, refinement measures can be based on the context of the detected sound. For example, if a produced spectrogram following a test command does not match a cover sound profile a temporary flag can be raised to indicate a recent failed match. In later iterations of method 300 if another known sound is detected following a subsequent test command and the failed match flag is present, the required threshold for the known sound to be considered a match to a cover sound profile can be altered. Such an arrangement can reduce user frustration in situations where the user is attempting, yet repeatedly failing, to identify a change in cover.

In embodiments, one or more feedback loops can alter parameters of the image recognition MLA. Parameters can include one or more of: duration of the failed match flag per instance, intensity of the matching threshold change responsive to a failed match flag being raised, whether the matching threshold is changed universally or for only one or more cover sound profiles identified as being most similar to the prior failed attempt, and an alert or prompt to the user that the cover sound profile is not recognized. In some embodiments, the effects of failing to match a cover sound profile can be amplified across failed attempts or set to activate once a certain number of failed attempts occur. In other words, the similarity threshold can be reduced upon failed attempts so that the adjustment operation corresponding to the closest cover sound profile can be made, even if an unrecognized cover is in use.

It should be understood that the individual operations used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

As previously discussed, cover sound profiles (i.e., spectrograms associated with particular covers) can be mapped to different device adjustment operations. In operation, a user can be presented with a suite of potential adjustments and then customize desired adjustment operations based on detected cover. These user preferences can then be associated with a user profile, such that the adjustments may be made to any device the user profile interacts with.

Referring to FIGS. 4A, 4B, 5A, and 5B spectrograms of different covers are shown according to embodiments. FIG. 4A is a spectrogram showing the cover sound profile a fabric front cover of a speaker. FIG. 4B is a spectrogram showing the cover sound profile of a wooden front cover of the same speaker as FIG. 4A. FIG. 5A is a spectrogram showing the spectrogram of white noise from 15-20 kHz produced by a speaker with a front fabric cover. FIG. 5B is a spectrogram showing the spectrogram of white noise from 15-20 kHz produced by the same speaker as FIG. 5A but with a front wooden cover.

Distinguishing between what speaker cover is mounted can improve the sound of user devices while simplifying and streamlining the user experience. Acoustically detecting the type of the speaker cover enables detection of covers used with existing speakers and can easily be updated to add cover sound profiles for new covers.

Embodiments of the present disclosure can therefore improve the sound of existing user devices without requiring hardware modifications or user interaction with the user device. Even devices that do not incorporate microphones can be controlled or manipulated using the disclosed method provided another device can detect sound. Accordingly, implementation of cover sound profile recognition can dramatically reduce production costs in comparison with cover detection means that involve active sensors or RFID tags incorporated into the cover. Further, cover sound profile recognition of the present disclosure enables a user to have a better listening experience without having to manually interact with the speaker or the speaker cover.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for detecting a cover sound profile, the cover sound profile including at least one sound sample produced from sound diffracted by a cover, the system comprising:
 a device comprising a housing and at least one speaker driver, the device configured to:
  selectively couple the cover via the housing;
  produce a sound via the at least one speaker driver;
 at least one microphone configured to:
  detect the sound; and
  produce an electrical signal from the detected sound; and
 at least one processor configured to:
  receive the electrical signal;
  determine, using a machine learning algorithm, that the electric signal meets or surpasses a similarity threshold to the cover sound profile; and
  change at least one characteristic of the device based on an adjustment operation associated with the determined cover sound profile.

2. The system of claim 1, wherein the at least one sound sample is at least one spectrogram and the at least one processor is further configured to, prior to determining, convert the electrical signal to a spectrogram.

3. The system of claim 1, wherein the at least one microphone is configured to detect the sound only upon receiving a test command.

4. The system of claim 1, wherein the sound is white noise.

5. The system of claim 1, wherein the sound is produced at an ultrasonic frequency.

6. The system of claim 1, wherein the cover is comprised of one or more of wood, fabric, plastic, marble, metal, glass, rubber, and leather.

7. The system of claim 1, wherein the at least one microphone is a microphone array.

8. The system of claim 1, wherein the machine learning algorithm incorporates a Fast Fourier Transform.

9. The system of claim 1, wherein the machine learning algorithm incorporates image recognition.

10. The system of claim 1, wherein the at least one processor is further configured to update the determined cover sound profile to include the electric signal.

11. The system of claim 1, wherein the determining is based in part on whether a preceding electric signal from a previous detected sound failed to meet or surpasses the similarity threshold with the cover sound profile.

12. A method for detecting a cover sound profiles, the cover sound profile including at least one sound sample produced from sound diffracted by a cover, the method comprising:

producing, via a speaker driver, a sound;
detecting, via a microphone, the sound;
producing an electrical signal from the detected sound;
transmitting the electrical signal to a processor;
determining, using recognition machine learning algorithm, that the electric signal meets or surpasses a similarity threshold to the cover sound profile; and
changing at least one characteristic of a device based on the control operation mapped to the determined cover sound profile.

13. The method of claim 12, wherein the at least one sound sample is at least one spectrogram and the method further comprises, converting, at the processor, the received electrical signal to a spectrogram prior to determining.

14. The method of claim 12, further comprising receiving a test command prior to detecting the sound.

15. The method of claim 12, wherein the sound is white noise.

16. The method of claim 12, wherein the sound is produced at an ultrasonic frequency.

17. The method of claim 12, the cover is comprised of one or more of wood, fabric, plastic, marble, metal, glass, rubber, and leather.

18. The method of claim 12, wherein the at least one processor is further configured to update the determined cover sound profile to include the electric signal.

19. The method of claim 12, wherein the machine learning algorithm incorporates image recognition.

20. The method of claim 19, wherein the determining is based in part on whether a preceding electric signal from a previous detected sound failed to meet or surpasses the similarity threshold with the cover sound profile.

* * * * *